United States Patent
Pederson et al.

[11] 3,881,101
[45] Apr. 29, 1975

[54] CORRELATOR METHOD AND SYSTEM FOR IDENTIFYING SEQUENCES OF PULSES

[75] Inventors: Kenneth C. Pederson, Plano; Marshall W. Jobe, Richardson, both of Tex.; Terry R. Stanhope, Ridgecrest, Calif.

[73] Assignee: Texas Instruments Incorporated, Dallas, Tex.

[22] Filed: Jan. 4, 1974

[21] Appl. No.: 430,981

[52] U.S. Cl......... 235/181; 343/5 DP; 343/17.1 PF; 343/100 CL
[51] Int. Cl. .................... G01s 7/28; G06b 15/34
[58] Field of Search .......... 235/181, 152; 343/5 DP, 343/17.1 R, 17.1 PF, 100 CL

[56] References Cited
UNITED STATES PATENTS

| | | | |
|---|---|---|---|
| 3,351,939 | 11/1967 | Olsen et al. | 343/17.1 R |
| 3,446,949 | 5/1969 | Trimble | 235/181 X |
| 3,598,979 | 8/1971 | Moreau | 235/181 |
| 3,631,490 | 12/1971 | Palmieri | 343/100 CL X |

Primary Examiner—Joseph F. Ruggiero
Attorney, Agent, or Firm—Harold Levine; Rene' E. Grossman; Alva H. Bandy

[57] ABSTRACT

The specification discloses a correlator for identifying sequences of pulses which includes a random access memory having a plurality of parallel storage cells for storing pulse correlation data. A clock generates periodic clock signals and a pointer sequentially addresses the storage cells in dependence upon the clock signals. A register is provided to receive the pulse correlation data stored in each cell when the cell is being addressed by the pointer. A counter is operable to count for a predetermined correlation window interval upon the detection of correlation data within a storage cell being addressed by the pointer. Circuitry is provided for detecting the reception of an incoming pulse during the window interval to indicate a pulse correlation. Circuitry is provided to increment the correlation data stored within the register upon detection of a pulse correlation. Circuitry is also provided for controlling the register to transfer the incremented pulse correlation data into the storage cell being addressed at the time of the pulse correlation.

35 Claims, 4 Drawing Figures

CORRELATOR METHOD AND SYSTEM FOR IDENTIFYING SEQUENCES OF PULSES

FIELD OF THE INVENTION

This invention relates to pulse correlation techniques, and more particularly relates to a method and system for identifying periodic sequences of pulses such as radar transmitter pulses.

THE PRIOR ART

Radar warning systems have been previously developed for detecting and identifying a particular radar transmitter by utilization of correlation techniques on the time of arrival of received radar pulses. Such prior radar warning systems included a shift register having a predetermined number of stages for receiving the input pulses, in combination with an AND gate. When the AND gate detected an input pulse at the same time as a pulse appeared at the output of the shift register, a pulse correlation for the specified pulse repetition interval (PRI) of a particular transmitter had occurred. Several stages of such a system were required in order to detect a specified number of sequential pulse correlations.

In order to combat the use of such fixed stage correlation systems, the PRI for various radars was slightly varied. Radar warning systems were then required to utilize a "window" at the output of the correlation shift register in order to detect a specific radar transmitter. The "window" circuitry generally comprised a multi-input OR gate which applied an output signal to the AND gate during a predetermined interval for correlation with the input pulses. The complexity of such radar warning systems was thus substantially increased, however, the systems were useful only to detect a specified PRI and a small percentage variation.

Due to the advent of more sophisticated weaponry and radar countermeasure devices, a need has thus arisen for a radar warning system which may be adjusted to identify and classify radar systems across the entire range of PRI and the transmitter bandwidth. Specifically, a warning system should be turnable to detect and identify a pluse stream having any PRI in the total range of 0.1 to 10 milliseconds (100 to 10,000 pulses per second) and any bandwidth of from 0 to 12.5 percent of the PRI. The system requirement is further complicated by the fact that such a radar warning system will often be simultaneously subjected to a large number of different radar pulse streams from a wide variety of radar systems.

Attempts have been made to provide the desired flexibility and accuracy of radar pulse identification and classification by the utilization of shift register delay lines for interval measurement and extensive decode logic to achieve the variable range of both PRI and bandwidth. However, such systems require significant amounts of expensive and complex hardware to detect a single pulse interval, in addition to identical sets of hardware for each succeeding interval to be correlated. The requirement for such a large number of shift register correlations presents a limiting factor in the use of such systems in avionics due to the size, cost and weight of the systems. A second approach to the above-noted problem has been to utilize a general purpose avionics computer which is programmed to provide pulse correlation. However, if such an avionics computer is to be free to do additional processing functions, pulses must be stored and processed at a later time and therefore this technique suffers from not being able to identify a pulse stream in real time. The use of an entire general purpose digital computer to provide real time pulse correlation is impractical due to the expense, size and weight involved.

SUMMARY OF THE INVENTION

In accordance with the present invention, a method and system of pulse correlation is provided which substantially eliminates or reduces many of the problems heretofore associated with the prior techniques previously noted. The present system enables pulse correlation of a sequence of pulses having any desired PRI and bandwidth, and yet the present system is relatively simple in operation and can be constructed from inexpensive lightweight integrated circuits.

In accordance with the present invention, a correlator is provided for identifying sequences of pulses and includes a memory having a plurality of storage cells for storing representations of pulse occurrences. A pointer sequentially addresses the cells at a predetermined rate. Circuitry is provided to initiate a predetermined correlation window interval upon the detection of a pulse occurrence representation in a cell being addressed. Circuitry detects the occurrence of a pulse during the window interval to indicate a time correlation, and circuitry stores representations of the pulse correlation in the storage cell presently being addressed at the time of the pulse correlation.

In accordance with another aspect of the invention, a correlator identifies periodic sequences of pulses and utilizes a memory having a plurality of parallel cells for storing representations or correlated pulses. Circuitry controls the number of cells used to store the representations. A pointer sequentially addresses the cells and circuitry is provided to control the rate at which the pointer addresses the cells. A counter is operable to count to an interval representative of a desired correlation window. Circuitry detects the occurrence of a pulse during the interval to indicate a time correlation and representations are generated of the correlated pulses for storage in the memory.

In accordance with yet another aspect of the invention, a correlator is provided to identify sequences of radar transmitter pulses. A random access memory includes a plurality of storage cells for storing pulse correlation data. A clock generates periodic clock signals and a pointer sequentially addresses the cell in dependence upon the clock signals. A register receives the pulse correlation data stored in each cell when the cell is being addressed by the pointer. A counter is operable to count for a predetermined window interval upon the detection of correlation data within a storage cell being addressed by the pointer. Circuitry detects the reception of an incoming pulse during the window interval to indicate a pulse correlation. Circuitry increments the pulse correlation data stored in the register upon detection of a pulse correlation. Circuitry then controls the register to transfer the incremented pulse correlation data into the storage cell being addressed at the time of the pulse correlation.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
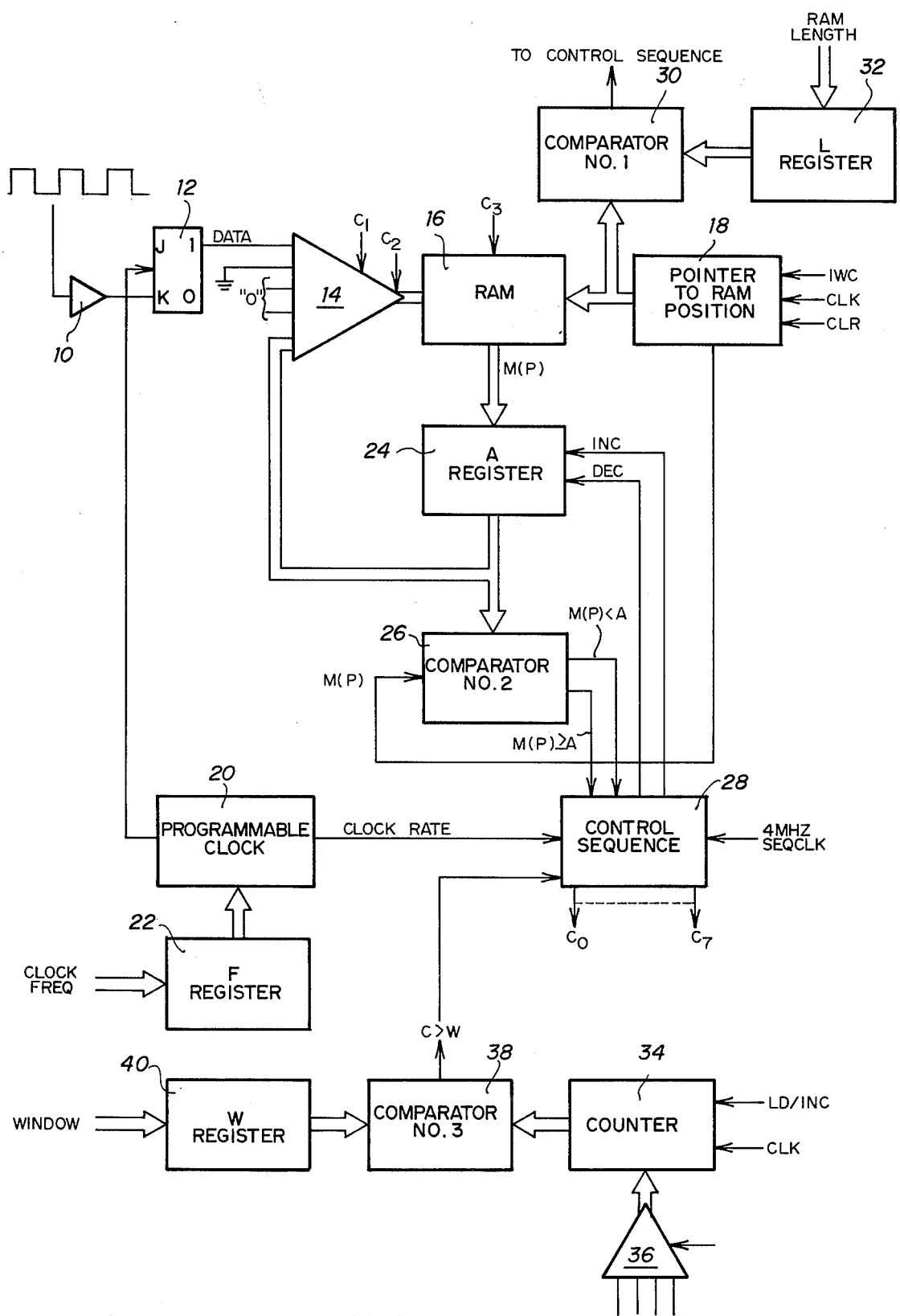
FIG. 1 is a block diagram of an embodiment of the present pulse correlation system.

Referring to FIG. 1, input pulses are applied through an amplifier 10 to the input of a flipflop 12. The input pulses may comprise any combination of series of periodic pulses. For example, the input pulses may be generated from the receiver of a radar warning system and thus represent pulse trains from a plurality of different types of radar systems having different pulse repetition intervals (PRIs). The output of the flipflop 12 is applied through a multiplexer 14 to a random access memory (RAM) 16. While it will be understood that the size of the RAM 16 will be varied for different applications, in the illustrated system, the RAM 16 includes 512 parallel memory cells, each cell having a 4-bit capacity. As will be subsequently described, the RAM 16 serves as a variable delay line permitting time correlation with past events. Digital indications of the number of correlations occurring at each point in time represented by a memory cell and stored in the particular memory cell.

A RAM pointer 18 comprises an addressing circuit which sequentially addresses the memory cells of the RAM 16 under the control of a clock signal supplied from a programmable clock 20. Clock 20 also controls the operation of the flipflop 12 and of various other portions of the system. The desired clock frequency of clock 20 is set into a register 22 which then varies the clock rate of clock 20. Clock 20 may comprise, for example, a series of divide-by-two flipflops which provides a plurality of available clock rates. The variance of the clock rate of clock 20, in combination with varying the effective length of RAM 16, enables any particular PRI of the input pulses to be detected, as will be subsequently described in greater detail.

When the pointer 18 is addressing a particular storage cell in the RAM 16, any correlation data stored within the addressed cell is read into an A register 24. Data stored in register 24 may be read back into RAM 16 through the multiplexer 14. A comparator circuit 26 compares the values stored in the A register 24 with the contents of the memory cell of RAM 16 presently being addressed by the pointer 18, to assure that the correlator system is tracking the pulse stream that has had the most correlations. If the content of a memory cell position P, designated as (M[P]), is greater than or equals the contents in A register, an indication is provided to a control sequence circuit 28 and the count contained within the register 24 is incremented to the value M[P]. However, if the content M[P] of the memory cell position is less than the value stored in the A register, the value stored in the memory cell being addressed is erased by operation of the control sequence 28. Control sequence 28, to be subsequently described in greater detail, operates to increment or decrement the values stored in the A register 24 according to pulse correlations and also generates control signals to provide clear signals to pointer 18 to clear the contents of a particular memory cell in the RAM 16.

A comparator 30 compares the position of the pointer 18 relative to the RAM 16 length with a value stored in a register 32. The desired RAM length for a particular PRI is stored within the register 32. When the value stored in the register 32 is equal to the position of the pointer 18, the pointer will be zeroed, or repositioned to the first starting storage cell of the RAM 16 to tune the system to detect a particular PRI. The RAM 16 may thus be defined as a $n = 4$ memory, where $n$ is such that:

$$\text{Clock Rate}/n = \frac{1}{(1-BW)\,PRI} \quad (1)$$

Operation of a counter 34 is initiated when the pointer 18 detects correlation data stored in a particular memory cell of the RAM 16. Control signals may be applied through a multiplexer 36 to provide reset and start signals to the counter 34 from the control sequence circuit 28. In addition, clock signals from the clock 20 are applied to the counter 34. The output of the counter 34 is compared by a comparator 38 with the value set in a register 40. The register 40 is loaded with a value representative of the width of the correlation window desired for particular operation of the system. When comparator 38 determines that the count in the counter 34 is greater than the number stored in register 40, comparator 38 generates a signal to the control sequence circuit 28 to indicate that the correlation window has terminated and the counter 34 is stopped.

The correlation window W thus defines the desired bandwidth (BW) detected by a particular system according to the following equation:

$$\text{Clock Rate}/W = \frac{1}{(2BW)PRI} \quad (2)$$

By varying the count stored in register 40, the bandwidth detected by the system may be easily varied.

It will thus be apparent that the clock rate is controlled by register 22 and the length of the RAM 16 may be varied by varying the value stored in register 32, in order to vary the PRI detected by the system. Further, the width of the correlation window may be varied by varying the value stored in register 40. With the use of the parallel memory cells of the RAM 16 to store representations of past correlations, a substantial saving in circuitry is achieved, in that duplicate register and decoder circuits for subsequent correlations is not required.

Due to the 4-bit capacity of the RAM 16, 3-bits of each memory cell may be utilized to store correlation data, and thus up to 8 pulse correlations may be stored in each memory cell. Flag bits may be stored in the fourth bit position in each RAM memory cell in order to track a single pulse stream in the presence of multiple streams each having the desired PRI. Further, by the use of the incrementing and decrementing capability of the system, correlation of $n$ out of the last $m$ possible pulse intervals is possible with the present system. This eliminates the requirement of prior systems for 100 percent pulse correlation.

Figure 2:
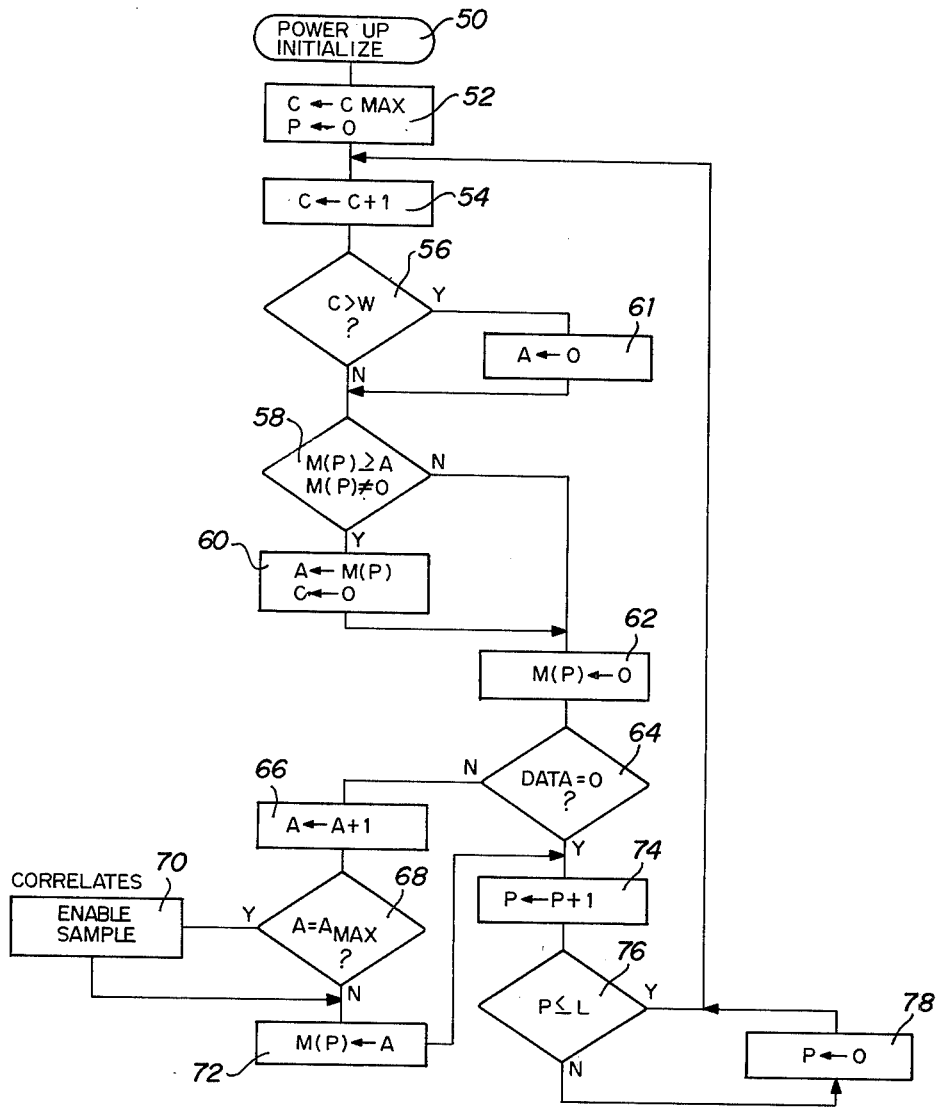
FIG. 2 is a flow chart of the operation of the circuitry shown in FIG. 1.

FIG. 2 is a flow diagam illustrating various operational steps in the operation of the system shown in FIG. 1. The following definitions apply to the flow diagram shown in FIG. 2:

| | | |
|---|---|---|
| C | = | Value in counter |
| P | = | Pointer position (points to 4-bit RAM memory cell being addressed). |
| M[P] | = | Contents of memory position P (4-bit RAM word at P) |
| A | = | Value stored in A register (counts number of successive correlations). |
| DATA INPUT | = | Input = 1 if pulse received<br>= 0 if none |
| N | = | Length of RAM being considered [(1-BW) PRI] (clock rate) |
| A MAX | = | Threshold of successive correlation to indicate desired pulse stream present. |

Referring to FIGS. 1 and 2, the system is powered up and initialized at 50. At step 52, the pointer 18 at set to zero and the counter 34 is checked to make sure that the maximum count as determined by register 40 is contained therein. The counter 34 is provided with the maximum count so that it is not initialized until valid correlation data is detected in one of the RAM memory cells.

The pointer 18 is then operated in dependence upon the programmable clock 20 to begin to sequentially address the parallel memory cells in the RAM 16, beginning with the first memory cell. In initial operation, zeroes will be stored in each one of the memory cells of the RAM 16. Thereafter, as each input pulse is applied to the flipflop 12, a "1" is placed in the register 24 and is read back through the multiplexer 14 into the memory cell presently being addressed by the pointer 18. Therefore, during the first initial cycle of operation in a noisy environment, a plurality of "1s" representative of pulse occurrences will be stored in various ones of the memory cells of the RAM 16.

At step 54, the counter 34 is incremented by one. If counter 34 is at its upper limit, the counter 34 remains at the upper limit and does not cycle back to zero.

A decision is made at 56 as to whether or not the value is counter 34 is greater than the value set in register 40. If the answer is "yes", the value stored in register 24 is zeroed at 61, as no correlation has occurred during the correlation window. If the answer to the decision at 56 is negative, a decision is made at 58 as to whether or not the contents of the memory cell presently being addressed by pointer 18 is not zero and is greater or equal to the value presently contained in the register 24. If the answer is "yes", at 60 the contents in register 24 are erased and the number contained in the memory cell presently being addressed is written into register 24 and the counter 34 is zeroed and begins counting again. In this way, only a number greater than "1" is input into a memory cell of the RAM 16 during the occurrence of a pulse correlation. Noise and erroneous pulse detections thus tend to be erased by the present system in favor of more valid data.

If the answer to the decision at 58 is negative, or if the contents of the memory cell being addressed are stored in register 24 according to step 60, the memory cell presently being addressed by pointer 18 is zeroed at 62.

A decision is made at 64 to determine whether or not a pulse was received during the correlation window interval, as determined by comparator 38. If the data input is not equal to zero, therefore indicating the occurrence of a pulse, the counter contained in register 24 is incremented by "1" at 66. A decision is made at 68 as to whether or not the count in register 24 is greater than the preset threshold as determined by comparator 26, in order to eliminate false alarms. If the answer is "yes", a pulse train is determined and a signal is generated at 70 to provide a suitable input to a computer or display system. If the answer to the decision at 68 is negative, the value in register 24 is read back into the memory cell presently being addressed in the RAM 16 at 72.

The pointer position is incremented by "1" at 74 in order to address the next succeeding memory cell in the RAM 16. A decision is made at 76 as to whether or not the desired length of the RAM 16 set in register 32 has been reached. If the pointer position is less than or equal to the maximum RAM length, the operation is reiterated beginning at step 54. If the pointer position is not equal to or less than the maximum RAM length, the pointer position is zeroed at 78 and operation of the system is reiterated beginning at step 54.

In summary, the pointer 18 sequentially addresses a preset number of memory cells in RAM 16 as determined by the value set in register 32, in order to control the PRI detected by the system. When the pointer addresses a memory cell containing a number representing one or more data correlations, the number is read from the memory cell being addressed into the register 24. At this time, the counter 34 begins counting from zero for an interval determined by the number set in the register 40 in order to control the bandwidth detected by the system. If during the correlation window determined by counter 34, an input pulse is applied from the flipflop 12, a pulse correlation is indicated and the number stored in register 24 is incremented by "1". This incremented number is then read back through the multiplexer 14 into the memory cell presently being addressed in the RAM 16. Often, the pointer 18 will have counted a number of memory cells since the initiation of operation of the counter 34 and thus the incremented number from the register 24 is stored in a subsequent memory cell of RAM 16.

When the register 24 is loaded with a correlation number and the counter 34 is operating, and the pointer 18 addresses a subsequent memory cell having a second correlation number therein, the counter is zeroed and begins counting again, if the second correlation number stored in the memory cell being addressed is equal to or greater than the number presently contained in register 24. However, if the second correlation number contained in the RAM memory cell is less than the number presently stored in the register 24, the memory cell will be zeroed and the counter 34 continues to count. In this way, noise and erroneous pulse inputs are eliminated during operation of the system.

By utilizing the fourth position in the 4-bit memory cells, a single target may be flagged with a 1-bit, so that only that target is tracked in case of a plurality of radar transmitters having identical PRIs and BW.

If no input pulse is received before the counter 34 reaches its maximum count as determined by register 40, the present system may zero the count in register 24 or alternatively may decrement the count in register 24 by "1" and write the decremented number back into the RAM memory cell. The system may thus operate as an up-down counter on success or failure of correlation and subsequent decision thresholds by the system may be determined by a random walk type analysis. The number of successful correlations required for a target may be adapted to an unknown PRI by varying the values required for indication of the target.

Figure 3:
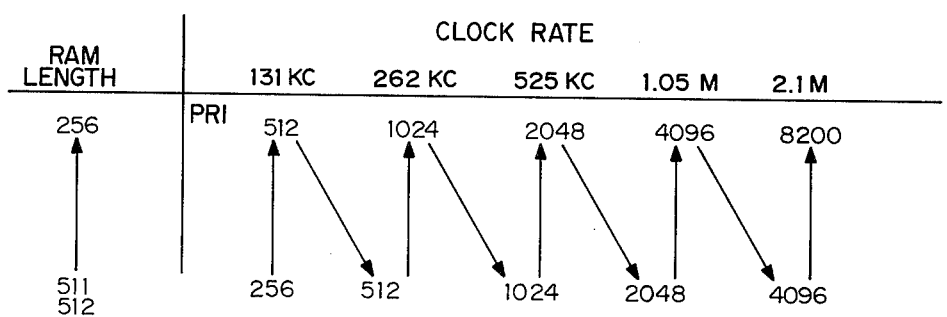
FIG. 3 is a diagram illustrating the variance of the random access memory length and clock rate in order to provide detection over a wide range of PRIs.

As previously indicated, an important aspect of the present invention is the ability to vary the PRI and bandwidth detected by the system. Referring to FIG. 3, the length of the RAM 16 may be varied between 256 memory cells to 512 memory cells. The clock rate is varied between 131 kc and 2.1 mc. The PRI detected by the system may thus be varied between 256 and 8,200 as illustrated in FIG. 3. This ability to conveniently and accurately vary the PRI of the system is of extreme importance.

Figure 4:
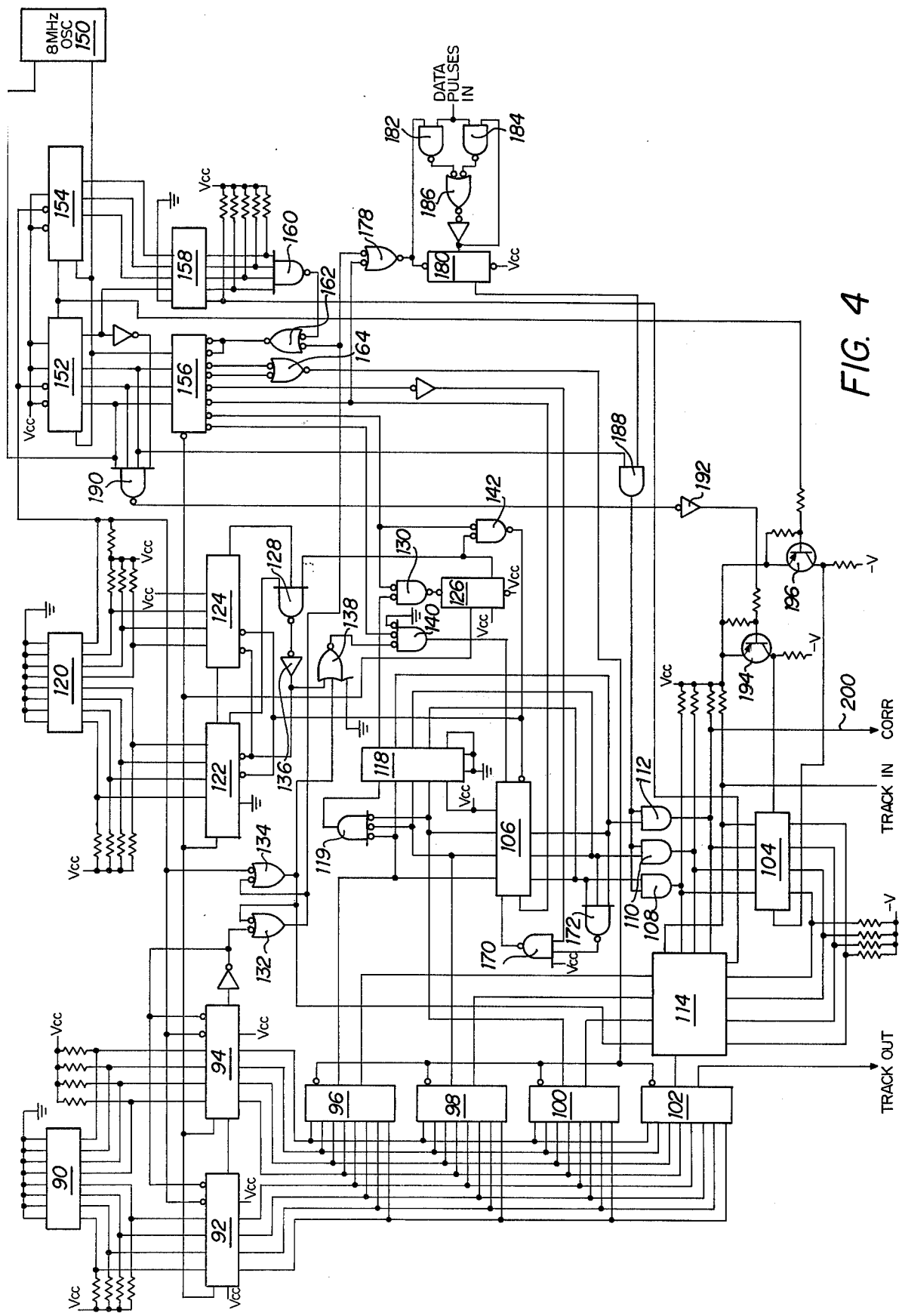
FIG. 4 is a schematic diagram of a second embodiment of the present system.

FIG. 4 illustrates a schematic diagram of a second embodiment employing the concepts of the present system. A multiposition manual switch 90 may be manually set in order to predetermine the length of the RAM of the system. Alternatively, address signals may be applied from a computer or the like to determine the length of the RAM. Two 4-bit counters 92 and 94 are connected in a cascaded configuration to provide an 8-bit register which applies 8-bit addresses to a random access memory comprising four RAMS 96–102. The 8-bit address is applied to the RAMs 96–102 to control the length of the RAM in a similar manner as that previously described with respect to FIG. 1. In this embodiment, the RAMs 96–102 comprise 256 memory or storage cells, with an additional 256 memory cells being provided by an MOS shift register 104. The first 256 memory cells provided by the shift register 104 are continuously connected in the circuit and are thus not varied, with the remaining 256 memory cells provided by the RAMs 96–102 varied in accordance with the 8-bit address provided by the counters 92–94.

The outputs of the RAMs 96–102 are applied to a 3-bit register 106 which corresponds to the A register 24 previously shown in FIG. 1. The output of register 106 is applied through AND gates 108–112 to the inputs of the shift register 104 and to a multiplexer 114 which corresponds with multiplexer 14 previously described. The output of register 104 is applied through the multiplexer 114. The multiplexer 114 thus applies signals from the A register 106 to the RAMs 96–102 and the register 104 in a similar manner as described with respect to FIG. 1.

The outputs of RAMs 96–102 are also applied to a comparator 118 and an AND gate 119 which corresponds to the comparator 26 of FIG. 1 and which operate to compare the values stored in the A register to the contents of the memory cell being addressed to assure that the correlator is tracking the pulse stream that has had the most correlations.

A multi-position manually operable switch 120 may be set in any one of a number of positions in order to determine the correlation window for operation of the present system. The switch positions are detected by an 8-bit counter comprising cascaded 4-bit counters 122 and 124.

Counter 122 and 124 are operable in response to control logic including a multivibrator 126, and NAND gates 128 and 130 to provide the count for the window interval in a similar manner as that previously described with respect to FIG. 1. OR gates 132 and 134 comprise a latch interconnected between counter 92 and 94 and a circuit clock in order to clear a memory cell upon command. The output of NAND gate 128 is connected through an invertor 136 to an input of a NOR gate 138 which also is connected to the latch comprising gates 132 and 134. The output of NOR gate 138 is applied to an input of an AND gate 140 which also receives clock pulses. The output of gate 140 is applied to the register 106. The Q output of the multivibrator 126 is applied through a NAND gate 142 to the register 106.

The variable clock for the present invention includes a fixed 8 MHz ocsillator 150 which provides a 8 MHz clock to a linear counter including counters 152 and 154 which operate to divide the clock signal downwardly. The divided clock signal is applied to a 3-to-8 decoder 156. In addition, a multi-position switch 158 may be manually set in order to determine the desired clock rate in accordance with the desired PRI to be detected by the system as previously described. Clock signals are then routed to various portions of the circuitry for timing and control. The output of switch 158 is applied through multi-input NAND gate 160 and through a NOR gate 162 to the 3-to-8 decoder 156. An output of the 3-to-8 decoder 156 is applied through a NOR gate 164 to the RAMs 96–102. The output of 3-to-8 decoder 156 is also applied through an invertor 168 to an input of a NAND gate 170, the output of which is applied to the register 106.

Outputs from the comparator 118 are applied through a NAND gate 172 and through the NAND gate 170 to the register 106. Outputs from the clock are also applied to a NOR gate 178 which is also connected to the memory clear latch comprising gates 132 and 134. The output of NOR gate 178 operates to clock a flip-flop 180 which receives, via NAND gates 182 and 184 and NOR gate 186, the input pulses. The output of the flipflop 180 is applied through an AND gate 188 which is clocked from the clock circuitry. The output of gate 188 is connected through AND gates 108–112 to the multiplexer 114. A multi-input NAND gate 190 provides decoding of the state of the counter and applies signals through an invertor 192 through a transistor 194 to provide clocking the signals for the shift register 104. Clock signals are also applied through a transistor 196 to clock the shift register 104. Transistor 194 and 196 operate as drivers to convert from TTL logic to MOS logic.

Operation of the circuitry shown in FIG. 4 is similar to the system previously described in FIG. 1. The frequency of the clock is set by adjustment of switches 158. The length of the correlation window is set by adjustment of the switches 120. The length of the RAM for a particular PRI application is set by operation of switches 90. Setting of the switches thus controls the PRI and bandwidth of the signals to be detected.

In operation, the clock operates to cause the memory cells in the shift register 104 and the designated memory cells in the RAMs 96–102 to be sequentially addressed in the manner previously noted. When correlation data is detected in a memory cell, correlation data is read into the A register 106 and the counters 122 and 124 are initiated to count for the correlation window. If a pulse is received by the flipflop 180 during the correlation window, the count contained in the register 106 is incremented up one count and the incremented data is read back through the multiplexer 114 to the memory cell presently being addressed. If during operation of the counters 122 and 124, the comparator 118 detects that another memory cell is addressed and has a count equal to or greater than the count stored in the register 106, the counter is restarted and the data stored in register 106 is changed to match the newly detected correlation data.

When the maximum desired length of the memory is reached, as determined by the setting of switch 90, the first memory cell in the register 104 is then addressed and the procedure begins again. The operation continues until the desired number of pulse correlations is provided and a CORR signal is generated on lead 200. As previously noted, the desired number may comprise a sequential number of correlations, or may comprise n out of m correlations. If no input pulse is received by the flipflop 180 during the correlation window as determined by the counters 122 and 124, the A register 106 may be zeroed, or alternatively may be decremented by one and written back into the memory cell presently being addressed.

A TRACK OUT signal is generated from RAM 102 to indicate the fourth bit which represents the signal desired to be tracked in the presence of multiple targets. The TRACK IN signal is read into the RAMs through the multiplexer 114 to force the system to track the desired target.

While it will be understood that various components may be used to implement the present system, the following represent integrated circuit components which may be used in the circuit shown in FIG. 4:

| Component Number in FIG. 4 | Standard Component Chip Type |
| --- | --- |
| 194–196 | 2N3829 |
| 160 | 5420 |
| 152–154 | 54163 |
| 140 | 5427 |
| 132–134 | 5400 |
| 130 | 5432 |
| 126–180 | 5474 |
| 122–124 | 54191 |
| 118 | 5485 |
| 114 | 54157 |
| 106 | 54193 |
| 96–102 | 3106 |
| 92–94 | 54161 |

The present system is thus extremely attractive for use in radar-homing devices and radar warning receivers, due to its extremely small size and inexpensiveness. The small size and cost of the present system permits the utilization of several correlation systems in parallel in order to look at different PRI ranges, frequency bands or azimuth areas of a received pulse stream.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A correlator for identifying sequences of pulses comprising:
    means having a plurality of storage cells for storing representations of pulse occurrences,
    means for sequentially addressing said cells at a predetermined rate,
    means for initiating a predetermined correlation window interval upon the detection of a pulse occurrence representation in a cell being addressed,
    means for detecting the occurrence of a pulse during said window interval to indicate a pulse correlation, and
    means for storing representations of said pulse correlation in the storage cell presently being addressed at the time of the pulse correlation.

2. The correlator of claim 1 and further comprising:
    means for varying the number of said storage cells in order to detect a predetermined pulse repetition interval.

3. The correlator of claim 1 and further comprising:
    means for varying said predetermined rate for addressing said cells in order to detect a specified pulse repetition interval.

4. The correlator of claim 1 and further comprising:
    means for varying said correlation window interval in order to detect a predetermined signal bandwidth.

5. The correlator of claim 1 wherein said means having a plurality of storage cells comprises a variable delay line.

6. The correlator of claim 1 wherein said means having a plurality of storate cells comprises a random access memory.

7. The correlator of claim 1 and further comprising:
    means for decrementing said representations of pulse occurrences if a pulse does not occur during said window interval.

8. The correlator of claim 1 wherein said means for sequentially addressing comprises:
    means for temporarily storing the contents of the cell being addressed during said window interval, and
    means for incrementing said temporarily stored contents in case of a pulse correlation.

9. A correlator for identifying sequences of pulses comprising:
    a random access memory having a plurality of parallel storage cells for storing representations of past pulse data,
    means for varying the number of said parallel storage cells utilized for storing in order to detect a specified pulse repetition interval,
    means for sequentially addressing said storage cells, and
    means for detecting the correlation between received pulses and stored representations of past pulse data in said storage cells.

10. The correlator of claim 9 wherein said storage cells include a bit address for receiving a tracking bit to provide tracking of a desired sequence of pulses.

11. The correlator of claim 9 and further comprising:
    means for initiating a predetermined correlation window interval upon the detection of stored representations of past pulse data.

12. The correlator of claim 9 and further comprising:
    means for storing indications of a correlation in the storage cell being addressed at the time of the correlation.

13. A correlator for identifying periodic sequences of pulses comprising:
    memory having a plurality of cells for storing representations of correlated pulses,
    means for controlling the number of said cells used to store said representations,
    pointer means for sequentially addressing said cells,
    means for controlling the rate at which said pointer means addresses said cells, counter means operable to count to an interval representative of a desired correlation window, means for detecting the occurrence of a pulse during said interval to indicate a pulse correlation, and means for generating representations of said correlated pulses for storage in said memory means.

14. The correlator of claim 13 wherein said memory means comprises a random access memory.

15. The correlator of claim 13 wherein said means for controlling the number of said cells and said means for controlling the rate are chosen such that said correlator detects a predetermined pulse repetition interval.

16. The correlator of claim 13 wherein said means for controlling the number of said cells comprises a register having a prescribed number set therein, and comparator means for comparing the position of said pointer means with said prescribed number.

17. The correlator of claim 13 wherein said means for controlling the rate comprises:

a programmable clock having means to vary the frequency thereof.

18. The correlator of claim 13 and further comprising:

means for varying said interval representative of a desired correlation window in order to specify the bandwidth detected by said correlator.

19. The correlator of claim 13 wherein said representations of said correlated pulses are stored in said memory means at the cell being addressed by said pointer means at the time of said pulse correlation.

20. The correlator of claim 13 and further comprising:

means for varying said representations of correlated pulses stored within said cells when a pulse does not occur during said interval.

21. The correlator of claim 20 wherein said representations of correlated pulses are decremented by one when a pulse does not occur during said interval.

22. The correlator of claim 20 wherein said representations of correlated pulses are erased from storage if a pulse does not occur during said interval.

23. A correlator for identifying sequences of radar transmitter pulses comprising:

means for receiving said pulses, a random access memory having a plurality of storage cells for storing pulse correlation data, a clock generating periodic clock signals, a pointer for sequentially addressing said cells in dependence upon said clock signals, a register for receiving the pulse correlation data stored in each cell when said cell is being addressed by said pointer, a counter operable to count for a predetermined window interval upon the detection of correlation data within a storage cell being addressed by said pointer, circuitry for detecting the reception of a pulse by said receiving means during said window interval to indicate a pulse correlation, circuitry for incrementing the pulse correlation data stored within said register upon detection of a pulse correlation, and circuitry for controlling said register to transfer the incremented pulse correlation data into the storage cell being addressed at the time of said pulse correlation.

24. The correlator of claim 23 wherein said means for receiving comprises:

a flipflop for storing said pulses,

25. The correlator of claim 23 and further comprising:

means for varying the number of storage cells in said random access memory such that said correlator detects a predetermined pulse repetition interval.

26. The correlator of claim 23 and further comprising:

means for varying the length of said predetermined window interval in order to specify the bandwidth detected by the system.

27. The correlator of claim 23 wherein the frequency of said periodic clock signals is varied in order to determine the pulse repetition interval detected by said correlator.

28. The correlator of claim 23 and further comprising:

circuitry for decrementing the pulse correlation data stored within said register if a pulse correlation is not detected during said predetermined window interval.

29. The correlator of claim 23 and further comprising:

circuitry for erasing the pulse correlation data stored within said register if a pulse correlation is not detected during said window interval.

30. The correlator of claim 23 and further comprising:

means for varying the pulse correlation data stored within said register and for reinitiating the start of said predetermined window interval if pulse correlation data detected in a subsequent cell is equal to or greater than the pulse correlation data presently stored within said register.

31. A method of identifying sequences of pulses in a correlation comprising:

storing representations of pulse occurrences in a plurality of storage cells, sequentially addressing the storage cells at a predetermined rate, initiating a predetermined correlation window interval upon the detection of a pulse occurrence representation in a cell being addressed, detecting the occurrence of a pulse during the window interval to indicate a pulse correlation, and storing representations of the pulse correlation in the storage cell being addressed at the time of the pulse correlation.

32. The method of claim 31 and further comprising:

varying the number of said storage cells in order to identify a predetermined pulse repetition interval.

33. The method of claim 31 and further comprising:

varying said predetermined rate in order to identify a predetermined pulse repetition interval.

34. The method of claim 31 and further comprising:

varying the length of said correlation window interval in order to identify a predetermined bandwidth.

35. A method for identifying sequences of radar transmitter pulses in a correlator comprising:

receiving said pulses, storing representations of the occurrence of said pulses in a random access memory having a plurality of storage cells, generating a periodic clock signal, sequentially addressing the storage cells in dependence upon the clock signal, temporarily storing in a register the representations of pulse occurrences stored in a cell when the cell is being addressed, initiating a predetermined window interval count upon the detection of representations of pulse occurrences within a storage cell being addressed, detecting the reception of an incoming pulse during the window interval count to indicate a pulse correlation, incrementing the representations of the temporarily stored pulse occurrences upon detection of the pulse correlation, and transferring the incremented representations into the storage cell being addressed at the time of the pulse correlation.

* * * * *